Jan. 12, 1937.  G. E. FRISZ  2,067,442
CLUTCH ALIGNING TOOL
Filed Aug. 6, 1934   3 Sheets-Sheet 2
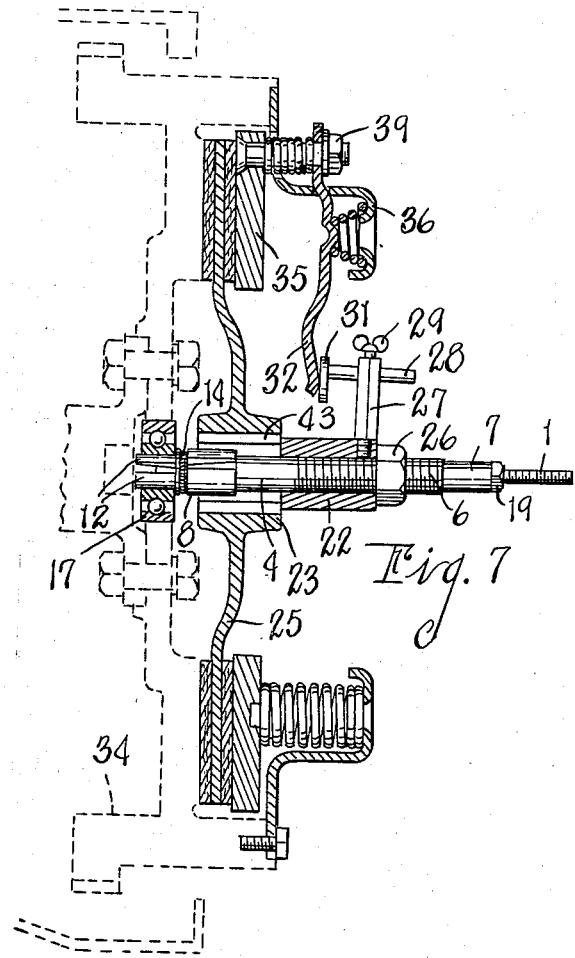
Fig. 7
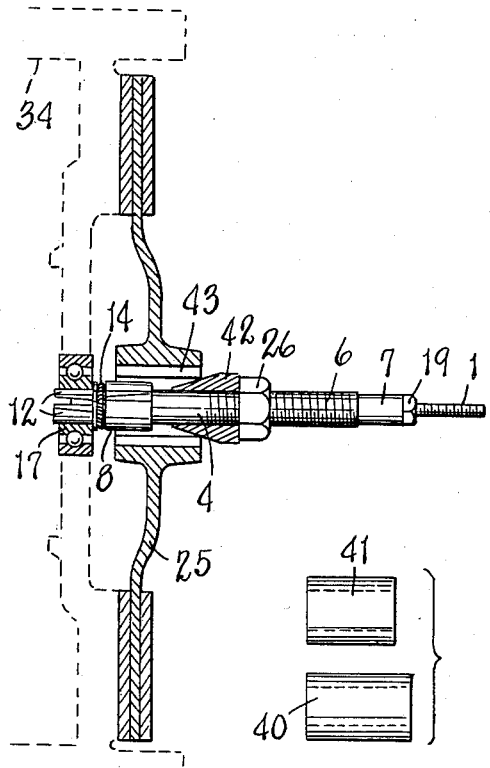
Fig. 8
Fig. 12
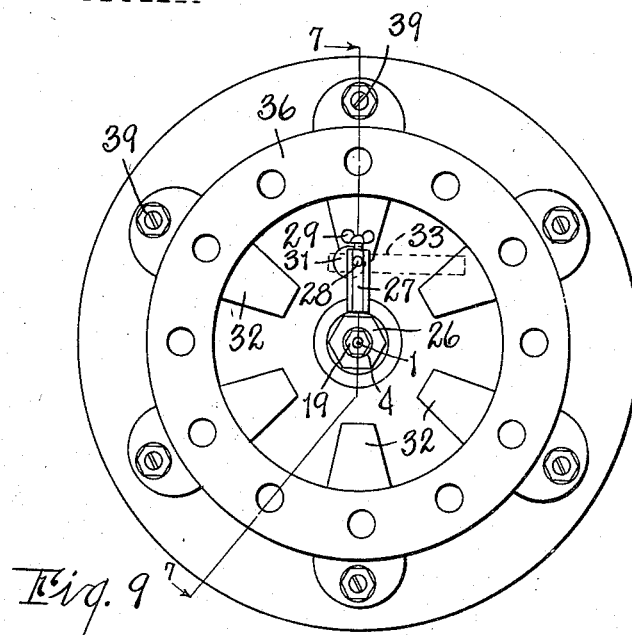
Fig. 9
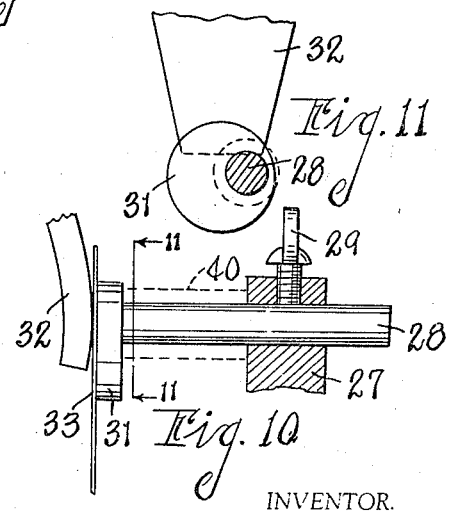
Fig. 11
Fig. 10
INVENTOR.
George E. Frisz
BY Chappell Earl
ATTORNEYS Jan. 12, 1937.　　　　　G. E. FRISZ　　　　2,067,442
CLUTCH ALIGNING TOOL
Filed Aug. 6, 1934　　　3 Sheets-Sheet 3

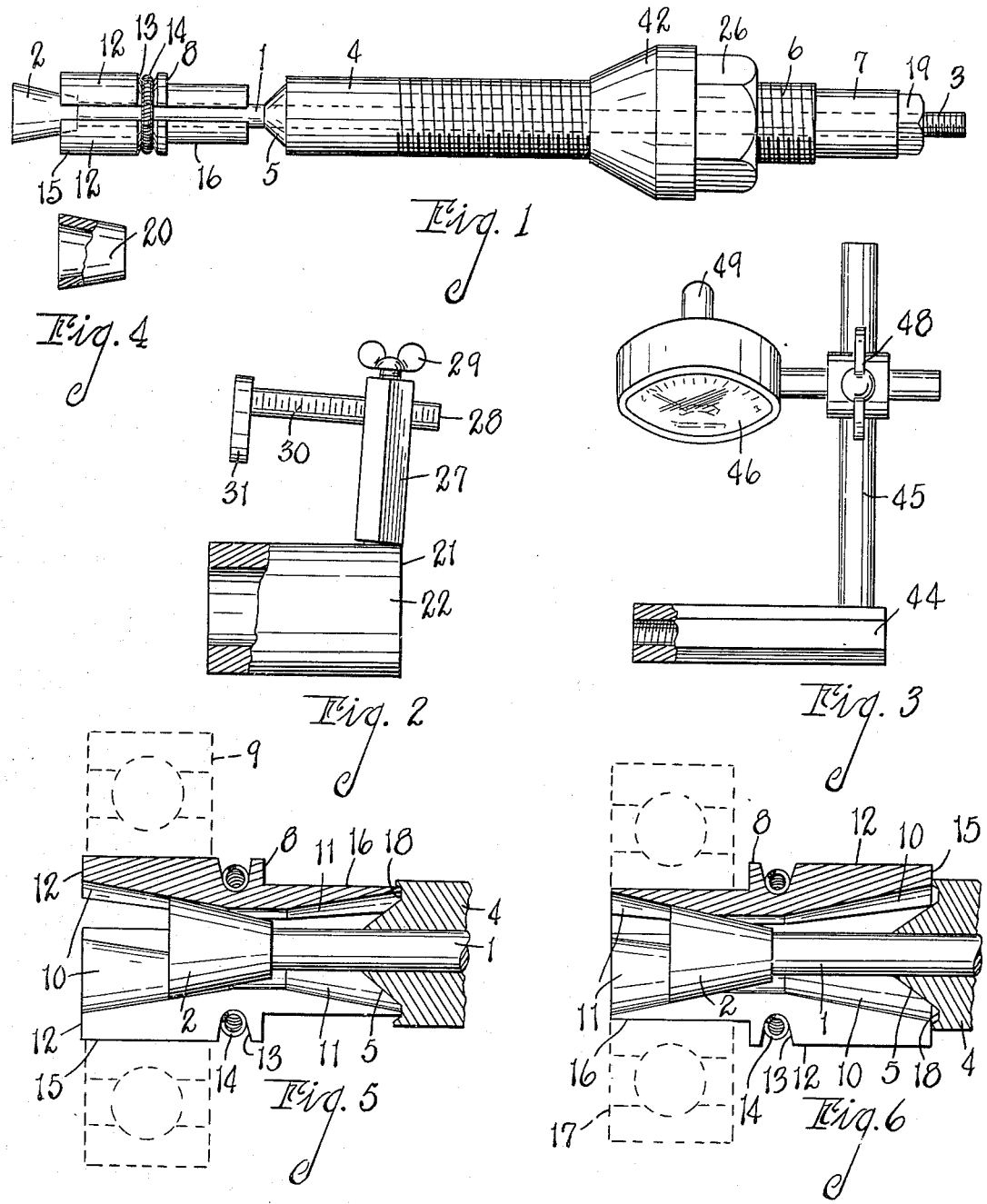

INVENTOR.
George E. Frisz
BY Chappell & Earl
ATTORNEYS.

Patented Jan. 12, 1937

2,067,442

UNITED STATES PATENT OFFICE 2,067,442

CLUTCH ALIGNING TOOL

George E. Frisz, Indianapolis, Ind., assignor, by mesne assignments, to Snap-On Tools, Inc., Kenosha, Wis., a corporation of Delaware Application August 6, 1934, Serial No. 738,643

27 Claims. (Cl. 29—89)

The main objects of this invention are:

First, to provide a clutch testing and adjusting tool which is especially well adapted for servicing clutches of automotive vehicles and the like.

Second, to provide a clutch aligning arbor or tool of this character which is simple and economical in its parts and by means of which various elements of the clutch can be checked and/or corrected.

Third, to provide in a tool of this character an improved expanding collet capable of adjustment for use with clutch pilot bearings having a wide range of diameters.

Objects relating to details and economies of my invention will appear from the description to follow. The invention is defined and pointed out in the claims.

A structure which is a preferred embodiment of my invention is illustrated in the accompanying drawings, in which:

Fig. 1 is a view in side elevation of a tool or arbor embodying certain features of my invention.

Fig. 2 is a view in side elevation of the clutch finger equalizing attachment, a portion of the bushing being broken away and shown in vertical section.

Fig. 3 is a view in side elevation of the dial indicating gauge attachment, a portion of the axial extension being broken away and shown in vertical section.

Fig. 4 is a view in side elevation of a conical sleeve adapted for use with the collet expanding cone for use with clutch pilot bearings of large diameter.

Fig. 5 is an enlarged fragmentary view partially in section and partially in elevation of the inner end of the tool, the collet being shown engaging within a pilot bearing indicated by dotted lines.

Fig. 6 is a view similar to Fig. 5, showing the collet reversed end to end with respect to its position in Fig. 5 for use with a pilot bearing of small diameter.

Fig. 7 is a fragmentary view partially in section on line 7—7 of Fig. 9, and partially in elevation, illustrating the use of my tool in checking the position of the radial clutch fingers or levers.

Fig. 8 is a similar view showing the use of my tool in aligning the friction disk or plate of the clutch.

Fig. 9 is a view in rear elevation of the assembly shown in Fig. 7.

Fig. 10 is an enlarged fragmentary view showing the manner of checking the position of the clutch fingers with the attachment and a feeler gauge.

Fig. 11 is a detail section on line 11—11 of Fig. 10.

Fig. 12 is a composite view showing a plurality of bushings or sleeves of different lengths for use with various types or sizes of clutches.

Figure 13:
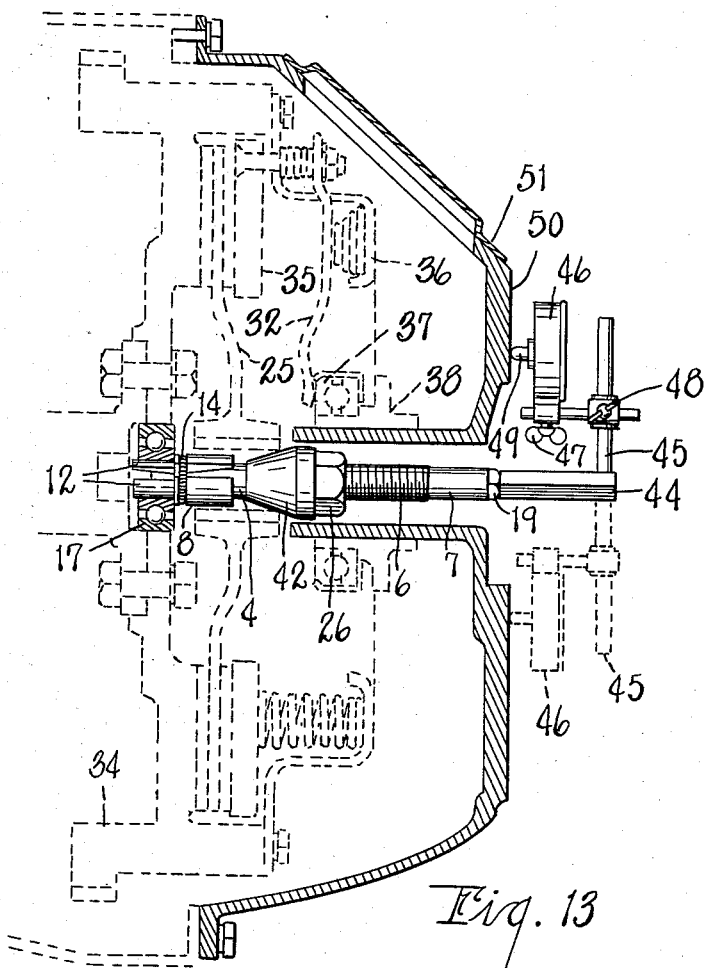
Fig. 13 is a fragmentary view partially in section and partially in elevation illustrating the use of my device for checking the position of the clutch housing or casing.

Referring to the drawings, in the illustrated embodiment of my invention, I is an elongated central spindle or shaft having a collet expanding cone 2 at its inner end and being externally threaded at 3 to its outer end. On this central shaft, I dispose a tubular sleeve 4 having a collet expanding cone 5 at its inner end and being externally threaded at 6 to its outer end. The extreme outer end portion 7 of the sleeve is of reduced diameter and is unthreaded as shown.

An expanding collet 8 is arranged on the inner end of the shaft 1, the collet being adapted to fit the pilot bearing 9 of the clutch and support the tool in alignment with the axis thereof. The collet has internal conical ends 10 and 11 for coaction with the expanding cones 2 and 5, the collet being reversible end-for-end on the shaft and comprising in the illustrated embodiment three sections 12 having an external peripheral central groove 13. An annular coiled spring 14 is seated in the groove 13 and acts to contract the sections of the collet.

One longitudinal end portion 15 of the collet is of relatively large diameter while the other end portion 16 is of reduced diameter. Thus, the collet is adapted for use with pilot bearings having a relatively large range of diameters. Fig. 5 shows the collet arranged for use with a pilot bearing 9 of relatively large diameter, and Fig. 6 shows the collet arranged for use with a pilot bearing 17 of relatively small diameter.

As shown in Fig. 5, the inner end of the sleeve 4 has an annular laterally facing groove 18 surrounding the cone 5 and acting to receive the small end 11 of the collet 8 to prevent the same from expanding over the rim of the sleeve when the cones 2 and 5 are drawn toward each other to expand the collet.

For drawing the collet expanding cones toward each other to expand the collet, I provide a nut 19 on the outer end of the central shaft adapted to engage the outer end of the tubular sleeve. Thus, when the nut 19 is screwed inwardly, the collet is expanded into engagement with the pilot bearing.

I provide the conical sleeve 20 for use with the cone 2 to increase the range of the expanding collet in the case of exceptionally large pilot bearings. The conical sleeve is illustrated by Fig. 4.

My clutch finger equalizing attachment 21, Figs. 2 and 7-11, comprises a relatively short bushing or sleeve 22 adapted to fit the tubular sleeve 4 and engage the hub 23 of the friction plate or disk 25, a nut 26 being threaded to the tubular sleeve to force the bushing into engagement with the hub 23. An inclined radial bracket 27 is mounted at the outer end of the bushing and carries a cross arm 28 for longitudinal and rotary adjustment, the arm being secured in adjusted position by the screw 29.

The cross arm 28 is longitudinally calibrated at 30 as shown and has an eccentric pilot plate or disk 31 at its outer end for checking the position of the radial clutch levers or fingers 32. This is done with the aid of a feeler gauge 33 as the tool is slowly rotated by manually cranking the engine (not shown), the fly wheel 34 being indicated by the dotted lines in Fig. 7.

It is to be understood that the type of clutch illustrated is shown merely by way of example. In clutches of the type shown, the pilot bearing 17 is arranged at the center of the fly wheel 34, the friction disk 25, thrust ring 35, radial fingers 32, mounting ring 36, thrust bearing 37, Fig. 13, and retractor collar 38 being designed to be in axial alignment.

For checking the clutch fingers 32, Figs. 7 to 11, the splined shaft (not shown) of the clutch is removed and my tool is substituted therefor, the collet being expanded within the pilot bearing 17 to support the device in alignment therewith. The attachment 22 is then slipped on the tubular sleeve 4 and the nut 26 tightened so that the bushing 22 is rotatably held in place between the hub 23 of the friction disk 25 and the nut. The sleeve is rotated and the fingers are individually adjusted. In checking the position of the fingers, the feeler gauge 33 is used.

If the fingers are not in the proper plane generated by the rotation of the eccentric plate 31, the whole pressure plate assembly of the clutch should be reconditioned. After this has been done and the clutch has been reassembled, the clutch fingers are again checked and equalized by adjusting the nuts 39.

The disk or plate 31 of the cross arm 28 is arranged in eccentric relation to the axis of the latter so that by turning the cross arm 28 the plate may be arranged for use with fingers of various lengths. It will be appreciated that in some clutches the inner ends of the fingers are spaced a greater distance from the axis of the splined shaft of the clutch than in others.

The sleeves or bushings shown in Fig. 12 are for use with clutches having different axial lengths. The bushing 40 is relatively long while the bushing 41 is relatively short. These bushings are adapted to receive the cross arm 28, as shown by Fig. 10, to fix the adjustment of the arm with respect to the bracket 27.

In Fig. 8, I show my tool in use in aligning the axis of the friction disk 25 with that of the pilot bearing 17. In this case, a large cone 42 is sleeved on the tubular sleeve 4 and forced within the splined opening 43 of the hub 23 by the nut 26. Thus, the clutch disk 25 is automatically axially aligned with the pilot bearing 17 by tightening the nut.

Referring to Figs. 3 and 13, 44 is an axial extension or bracket adapted to be threaded to the outer end of the central shaft 1, the bracket having a radial arm 45. A dial indicating gauge 46 is connected to the radial arm 45 for universal adjustment by means of the screw connections 47 and 48, the gauge having a feeler 49 adapted to engage the surface 50 at the outer end of the clutch housing or casing 51. Thus, the position of the housing is readily checked and any misalignment such as that caused by warpage can be corrected. The tool is rotated by cranking the engine slowly.

Figure 14:
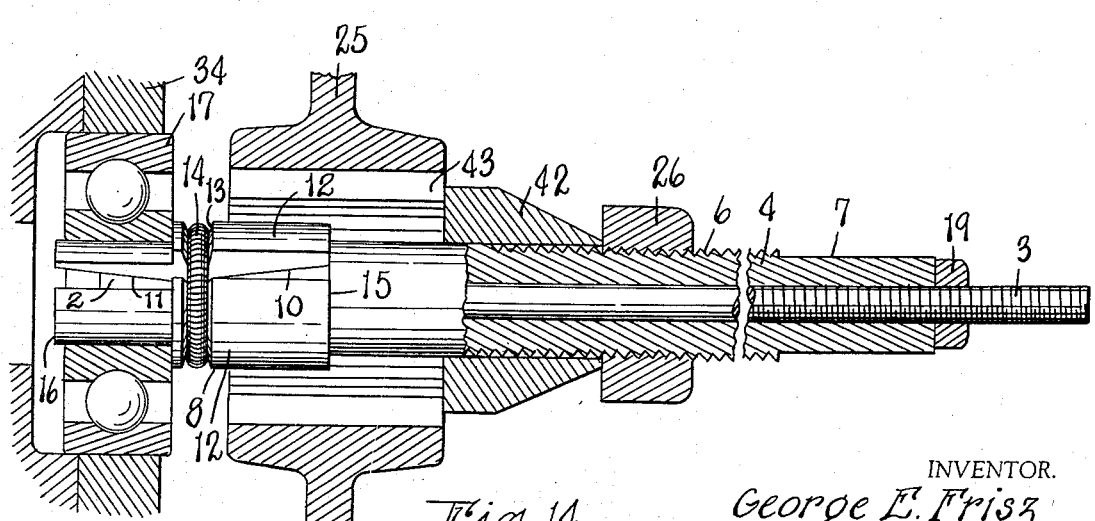
Fig. 14 is an enlarged fragmentary view partially in elevation and partially in section showing the use of my tool in pulling or removing the pilot bearing of the clutch.

As shown by Fig. 14, the pilot bearing 17 of the clutch may be pulled by arranging the parts as shown. After the tool has been tightened, the clutch disk 25 is positioned on the fly wheel 34 and the flat side of the large cone 42 is placed against the outer side of the hub 23 of the disk and pressure is applied with the large nut 26. The pilot bearing 17 is thus quickly and easily removed from within the fly wheel 34.

From the above description of my invention, it will be appreciated by those skilled in the art that I provide a tool which, although simple and economical in its parts, is capable of accurately testing and adjusting the parts of a clutch to be serviced. The tool has a wide range of adjustment and is therefore capable of use with the clutches of various types and sizes. I have not described the clutch in detail nor gone into its operation because these things are well understood by those skilled in the art.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. In a clutch testing and adjusting tool of the character set forth, for servicing clutches of the type having a pilot bearing, a friction disk and a housing in axial alignment, the combination with an elongated shaft of a length sufficient to extend from the pilot bearing to a point externally of the housing of the clutch and having a collect expanding cone at its inner end and being externally threaded to its outer end, of a tubular sleeve on said shaft and having a collet expanding cone at its inner end and being externally threaded to its outer end, an expanding collet on said shaft adapted to fit the pilot bearing of the clutch and support said shaft in alignment with the axis thereof, a nut threaded to said shaft and engaging the outer end of said sleeve for expanding said collet, a cone sleeved on said sleeve for coaction with the friction disk, and a nut threaded to said sleeve for coaction with the outer end of said last named cone for urging the same into engagement with the friction disk.

2. In a clutch testing and adjusting tool of the character set forth, for servicing clutches of the type having a pilot bearing, a friction disk and a housing in axial alignment, the combination with an elongated shaft of a length sufficient to extend from the pilot bearing to a point externally of the housing of the clutch and having a collet expanding cone at its inner end, of a tubular sleeve on said shaft and having a collet expanding cone at its inner end, an expanding collet on said shaft adapted to fit the pilot bearing of the clutch and support said shaft in alignment with the axis thereof, means threaded to said shaft and engaging the outer end of said sleeve for expanding said collet, a cone sleeved on said sleeve for coaction with the friction disk, and means threaded to said sleeve for coaction with the outer end of said last named cone for urging the same into engagement with the friction disk.

3. In a clutch testing and adjusting tool of the character set forth, the combination with an elongated shaft having a collet expanding cone at its inner end, of a tubular sleeve on said shaft and having a collet expanding cone at its inner end, an expanding collet on said shaft, a nut threaded to said shaft and engaging the outer end of said sleeve for expanding said collet, a cone sleeved on said sleeve, and a nut threaded to said sleeve for coaction with the outer end of said last named cone.

4. In a clutch testing and adjusting tool of the character set forth, for servicing clutches of the type having a pilot bearing and a friction disk in axial alignment, the combination with an elongated shaft having a collet expanding cone at its inner end, of a tubular sleeve on said shaft and having a collet expanding cone at its inner end, an expanding collet on said shaft adapted to fit the pilot bearing of the clutch and support said shaft in alignment with the axis thereof, means disposed at the outer end of said sleeve and shaft for expanding said collet, a cone sleeved on said sleeve for coaction with the friction disk, and means arranged on said sleeve for coaction with the outer end of said last named cone for urging the same into engagement with the friction disk.

5. In a clutch testing and adjusting tool of the character set forth, for servicing clutches having a pilot bearing, a friction disk and radial clutch operating levers, the combination with a central shaft having a collet expanding cone at its inner end, of a tubular sleeve on said shaft and having a collet expanding cone at its inner end, an expanding collet on said shaft adapted to fit the pilot bearing and support said shaft in axial alignment therewith, means on the other outer end of said shaft for actuating said sleeve to expand said collet, a bushing sleeved on said sleeve, means acting to urge said bushing into engagement with the hub of the friction disk, an inclined radial bracket on said bushing, and an arm carried by said bracket for longitudinal and rotary adjustment and having an eccentric plate at one end for checking the position of the radial levers with respect to a common plane at right angles to the axis of the pilot bearing and friction disk.

6. In a clutch testing and adjusting tool of the character set forth, for servicing clutches having a pilot bearing, a friction disk and radial clutch operating levers, the combination with a central shaft having a collet expanding cone at its inner end, of a tubular sleeve on said shaft and having a collet expanding cone at its inner end, an expanding collet on said shaft adapted to fit the pilot bearing and support said shaft in axial alignment therewith, means on the outer end of said shaft for actuating said sleeve to expand said collet, a bushing sleeved on said sleeve, means acting to urge said bushing into engagement with the hub of the friction disk, an inclined radial bracket on said bushing, and an arm carried by said bracket for checking the position of the radial levers.

7. In a clutch testing and adjusting tool of the character set forth, for servicing clutches having a pilot bearing, a friction disk and radial clutch operating levers, the combination with a central shaft, of a tubular sleeve on said shaft, an expanding collet on the inner end of said shaft adapted to fit the pilot bearing and support said shaft in axial alignment therewith, a bushing sleeved on said sleeve, means acting to urge said bushing into engagement with the hub of the friction disk, a radial bracket on said bushing, and an arm carried by said bracket for longitudinal and rotary adjustment and having an eccentric plate at one end for checking the position of the radial levers with respect to a common plane substantially at right angles to the axis of the pilot bearing and friction disk.

8. In a clutch testing and adjusting tool of the character set forth, for servicing clutches having a pilot bearing, a friction disk and radial clutch operating levers, the combination with a central shaft, of a tubular sleeve on said shaft, an expanding collet on the inner end of said shaft adapted to fit the pilot bearing and support said shaft in axial alignment therewith, a bushing on said sleeve, a radial bracket on said bushing, and an arm carried by said bracket for longitudinal and rotary adjustment and having an eccentric plate at one end for checking the position of the radial levers with respect to a common plane substantially at right angles to the axis of the pilot bearing and friction disk.

9. In a clutch testing and adjusting tool of the character set forth, the combination with a central shaft having a collet expanding cone at its inner end, of a tubular sleeve on said shaft and having a collet expanding cone at its inner end, an expanding collet on said shaft, means on the outer end of said shaft for actuating said sleeve to expand said collet, a bushing on said sleeve, a radial bracket on said bushing, and an arm carried by said bracket for longitudinal and rotary adjustment and having an eccentric plate at its inner end.

10. In a clutch testing and adjusting tool of the character set forth, for servicing clutches of the type having a pilot bearing, the combination with a central shaft having a collet expanding cone at its inner end, of a tubular sleeve on said shaft and having a collet expanding cone at its inner end, an expanding collet disposed on said shaft between said cones and having internal conical ends for coaction therewith, the collet being reversible end-for-end on said shaft and comprising a plurality of sections having an external central groove, and an annular coiled spring seated in said groove and acting to contract said sections, one longitudinal portion of the collet being of larger diameter than the other, and means threaded to the outer end of said shaft for coaction with the outer end of said sleeve to expand said collet into engagement with the pilot bearing of the clutch, the inner end of said sleeve having an annular laterally facing groove surrounding said cone on its inner end and acting to receive the smaller end of said collet to prevent the same frome expanding over the rim of said sleeve.

11. In a clutch testing and adjusting tool of the character set forth, for servicing clutches of the type having a pilot bearing, the combination with a central shaft having a collet expanding cone at its inner end, of a tubular sleeve on said shaft and having a collet expanding cone at its inner end, an expanding collet disposed on said shaft between said cones and having internal conical ends for coaction therewith, the collet being reversible end-for-end on said shaft and comprising sections having an external central groove, and an annular coiled spring seated in said groove and acting to contract said sections, one longitudinal portion of the collet being of larger diameter than the other, and means threaded to the outer end of said shaft for coaction with the outer end of said sleeve to expand said collet into engagement with the pilot bearing of the clutch.

12. In a clutch testing and adjusting tool of the character set forth, a central shaft having a collet expanding cone at its inner end, of a tubular sleeve on said shaft and having a collet expanding cone at its inner end, an expanding collet disposed on said shaft between said cones and having internal conical ends for coaction therewith, the collet comprising sections having an external groove, and an annular coiled spring seated in said groove and acting to contract said sections, one end of the collet being of less diameter than the other, and means threaded to the outer end of said shaft for coaction with the outer end of said sleeve to expand said collet, the inner end of said sleeve having an annular groove surrounding said cone on its inner end and acting to receive the small end of said collet to prevent the same from expanding over the rim of said sleeve.

13. In a clutch testing and adjusting tool of the character set forth, a central shaft having a collet expanding cone at its inner end, of a tubular sleeve on said shaft and having a collet expanding cone at its inner end, an expanding collet disposed on said shaft between said cones and having internal conical ends for coaction therewith, the collet comprising sections having an external groove, and an annular coiled spring seated in said groove and acting to contract said sections, one end of the collet being of less diameter than the other, and means threaded to the outer end of said shaft for coaction with the outer end of said sleeve to expand said collet.

14. In a clutch testing and adjusting tool of the character set forth, for servicing clutches of the type having a pilot bearing the combination with a central shaft having a collet expanding cone at its inner end, of a conical sleeve on said cone, a tubular sleeve on said shaft and having a collet expanding cone at its inner end, an expanding collet disposed on said shaft between said cones and having internal conical ends for coaction therewith, the collet being reversible end-for-end on said shaft and comprising three sections having an external central groove, and an annular coiled spring seated in said groove and acting to contract said sections, one of the collet being of greater diameter than the other.

15. In a clutch testing and adjusting tool of the character set forth, for servicing clutches of the type having a pilot bearing, the combination with a central shaft having a collet expanding cone at its inner end, of a tubular sleeve on said shaft and having a collet expanding cone at its inner end, an expanding collet disposed on said shaft between said cones and having internal conical ends for coaction therewith, the collet being reversible end-for-end on said shaft and comprising a plurality of sections having an external central groove, and an annular coiled spring seated in said groove and acting to contract said sections, one end of the collet being of greater diameter than the other.

16. In a clutch testing and adjusting tool of the character set forth, for servicing clutches of the type having a pilot bearing, a friction disk and a housing in axial alignment, the housing having its outer end in a plane at right angles to such axis, the combination with an elongated central shaft of a length sufficient to extend from the pilot bearing to a point externally of the outer end of the housing and having a collet expanding cone at its inner end, of a tubular sleeve on said shaft and having a collet expanding cone at its inner end, an expanding collet on said shaft adapted to fit the pilot bearing and support said shaft in alignment with the axis thereof, means on the outer end of said shaft coacting with the outer end of said sleeve for expanding said collet, a cone sleeved on said sleeve for coaction with the hub of the friction disk, means on said sleeve acting to force said last named cone into engagement with the hub of the friction disk, an axial bracket threaded to the outer end of said shaft and having a radial arm, and an indicating gauge carried by said arm for coaction with the outer end of said housing for checking the position of the same relative to the axis of the clutch.

17. In a clutch testing and adjusting tool of the character set forth, for servicing clutches of the type having a pilot bearing, a friction disk and a housing in axial alignment, the housing having its outer end in a plane at right angles to such axis, the combination with an elongated central shaft of a length sufficient to extend from the pilot bearing to a point externally of the outer end of the housing, of a tubular sleeve on said shaft, an expanding collet on said shaft adapted to fit the pilot bearing and support said shaft in alignment with the axis thereof, means on the outer end of said shaft for expanding said collet, a cone sleeved on said sleeve for coaction with the hub of the friction disk, means on said sleeve acting to force said last named cone into engagement with the hub of the friction disk, an axial bracket threaded to the outer end of said shaft and having a radial arm, and an indicating gauge carried by said arm for coaction with the outer end of said housing for checking the position of the same relative to the axis of the clutch.

18. In a clutch testing and adjusting tool of the character set forth, for servicing clutches of the type having a pilot bearing, and a housing in axial alignment, the housing having its outer end in a plane at right angles to such axis, the combination with an elongated central shaft of a length sufficient to extend from the pilot bearing to a point externally of the outer end of the housing, of a tubular sleeve on said shaft, an expanding collet on said shaft adapted to fit the pilot bearing and support said shaft in alignment with the axis thereof, means on the outer end of said shaft for expanding said collet, an axial bracket threaded to the outer end of said shaft and having a radial arm, and an indicating gauge carried by said arm for coaction with the outer end of said housing for checking the position of the same relative to the axis of the clutch.

19. In a clutch testing and adjusting tool of the character set forth, for servicing clutches of the type having a pilot bearing and a housing in axial alignment, the combination with an elongated central shaft of a length sufficient to extend from the pilot bearing to a point externally of the outer end of the housing, of a tubular sleeve on said shaft, an expanding collet on said shaft adapted to fit the pilot bearing and support said shaft in alignment with the axis thereof, means on the outer end of said shaft for expanding said collet, an axial bracket on the outer end of said shaft and having an indicating gauge for coaction with the outer end of said housing for checking the position of the same.

20. In a clutch testing and adjusting tool of the character set forth, the combination with a shaft or spindle having a collet expanding cone at its inner end, of a tubular sleeve on said shaft and having a collet expanding cone at its inner end, an expanding collet on said shaft, means on the outer end of said shaft coacting with the outer end of said sleeve for expanding said collet, a bracket on the outer end of said shaft, and an indicating gauge carried by said bracket.

21. In a clutch testing and adjusting tool of the character set forth, for servicing clutches of the type having a pilot bearing, and a friction disk, the combination with an elongated central shaft and having a collet expanding cone at its inner end, of a tubular sleeve on said shaft and having a collet expanding cone at its inner end, an expanding collet on said shaft adapted to fit the pilot bearing, means on the outer end of said shaft coacting with the outer end of said sleeve for expanding said collet, a bushing sleeved on said sleeve for coaction with the hub of the friction disk, and means on said sleeve acting to force said bushing into engagement with the hub of the friction disk to pull said pilot bearing.

22. In a clutch testing and adjusting tool, the combination of a shaft or spindle having an outwardly facing collet expanding cone at its inner end, an inwardly facing collet expanding cone sleeved on said spindle for axial adjustment thereon, an expanding collet comprising complementary cylindrical curved sections of a larger diameter at one end than at the other and having central peripherally disposed registering grooves, said sections being inwardly tapered at each end to coact with said cones, a spring engaging said grooves and acting to collapse said sections and retain them in assembled relation on said spindle, and a threaded means at the outer end of said spindle for urging said expanding cones towards each other and thereby expand the collet.

23. In a clutch testing and adjusting tool, the combination of a shaft or spindle having an outwardly facing collet expanding cone at its inner end, an inwardly facing collet expanding cone sleeved on said spindle for axial adjustment thereon, an expanding collet comprising complementary cylindrical curved sections having central peripherally disposed registering grooves, a spring engaging said grooves and acting to collapse said sections and retain them in assembled relation on said spindle, and a threaded means at the outer end of said spindle for urging said expanding cones towards each other and thereby expand the collet.

24. In a clutch testing and adjusting tool, the combination of a shaft or spindle having an outwardly facing collet expanding cone at its inner end, an inwardly facing collet expanding cone sleeved on said spindle for axial adjustment thereon, an expanding collet comprising complementary cylindrical curved sections of a larger diameter at one end than at the other and being reversible on said spindle, and means at the outer end of said spindle for urging said expanding cones towards each other and thereby expand the collet.

25. In a clutch testing and adjusting tool, the combination with a spindle threaded at its outer end, of a pilot bearing collet at the inner end of said spindle, means for expanding said collet into clamping engagement with a pilot bearing, a clutch disk engaging cone adjustably mounted on said spindle for engagement with the hub of a clutch disk, and a housing testing gauge detachably and adjustably mounted on the outer end of said spindle.

26. In a clutch testing and adjusting tool, the combination with a spindle threaded at its outer end, of a pilot bearing collet at the inner end of said spindle, means for expanding said collet into clamping engagement with a pilot bearing, a clutch disk engaging cone adjustably mounted on said spindle for engagement with the hub of a clutch disk, and a housing testing gauge on the outer end of said spindle.

27. A clutch testing and adjusting tool of the class described comprising in combination a spindle, an expanding pilot bearing collet at the inner end of said spindle, means for expanding said collet from the outer end of said spindle, a clutch disk hub engaging collar carried by said spindle, means carried by said spindle for clamping said collar against the clutch disk hub, and an adjustable clutch finger gauge carried by said collar.

GEORGE E. FRISZ.